(12) United States Patent
Chester

(10) Patent No.: US 9,853,964 B2
(45) Date of Patent: Dec. 26, 2017

(54) SYSTEM AND METHOD FOR AUTHENTICATING THE LEGITIMACY OF A REQUEST FOR A RESOURCE BY A USER

(71) Applicant: Robojar Pty Ltd, Guildford (AU)

(72) Inventor: Jacques Noel Marc Chester, Guildford (AU)

(73) Assignee: Robojar Pty Ltd, Guildford (AU)

( * ) Notice: Subject to any disclaimer, the term of this patent is extended or adjusted under 35 U.S.C. 154(b) by 1014 days.

(21) Appl. No.: 14/110,699

(22) PCT Filed: Nov. 27, 2012

(86) PCT No.: PCT/IB2012/056770
§ 371 (c)(1),
(2) Date: Oct. 8, 2013

(87) PCT Pub. No.: WO2014/083382
PCT Pub. Date: Jun. 5, 2014

(65) Prior Publication Data
US 2016/0285861 A1    Sep. 29, 2016

(51) Int. Cl.
*H04L 29/06* (2006.01)
*H04L 9/14* (2006.01)
(Continued)

(52) U.S. Cl.
CPC ........ *H04L 63/0823* (2013.01); *G06F 21/335* (2013.01); *G06F 21/44* (2013.01);
(Continued)

(58) Field of Classification Search
CPC ..... H04L 63/06; H04L 63/08; H04L 63/0823; H04L 63/12; H04L 9/0618; H04L 9/14; H04L 9/30; H04L 63/123; H04L 63/126; H04L 63/1433; H04L 63/166; H04L 9/3242; H04L 9/3247; H04L 9/3263; H04L 2209/60; G06F 2221/2115; G06F 2221/2135; G06F 21/335; G06F 21/44; G06F 21/6272; G06F 21/645; G06C 2220/12
See application file for complete search history.

(56) References Cited

U.S. PATENT DOCUMENTS 7,797,543 B1 * 9/2010 Campbell ............... H04L 63/08
713/176
7,877,800 B1    1/2011 Satish et al. .................... 726/22
(Continued)

OTHER PUBLICATIONS

Stallings, William. Cryptography and Network Security: Principles and Practices. 4th ed. Upper Saddle River, NJ: Pearson/Prentice Hall, 2006. Print.*

*Primary Examiner* — Eleni Shiferaw
*Assistant Examiner* — Alexander Lapian
(74) *Attorney, Agent, or Firm* — Hickman Palermo Becker Bingham LLP

(57) ABSTRACT

A method of authenticating the legitimacy of a request for a resource from a resource provider by a user, including providing an authentication process in which a resource provider message is received and de-assembled, the integrity of the user request message is confirmed, a result indicator as to the legitimacy of the resource provider message is created by performing two or more authenticity checks, and an authentication result is sent.

23 Claims, 10 Drawing Sheets

(51) Int. Cl.
*H04L 9/30* (2006.01)
*H04L 9/32* (2006.01)
*G06F 21/33* (2013.01)
*G06F 21/44* (2013.01)
*G06F 21/62* (2013.01)
*G06F 21/64* (2013.01)
*H04L 9/06* (2006.01)

(52) U.S. Cl.
CPC ........ *G06F 21/6272* (2013.01); *G06F 21/645* (2013.01); *H04L 9/0618* (2013.01); *H04L 9/14* (2013.01); *H04L 9/30* (2013.01); *H04L 9/3242* (2013.01); *H04L 9/3247* (2013.01); *H04L 9/3263* (2013.01); *H04L 63/06* (2013.01); *H04L 63/12* (2013.01); *H04L 63/123* (2013.01); *H04L 63/1433* (2013.01); *H04L 63/166* (2013.01); *G06F 2221/2115* (2013.01); *G06F 2221/2135* (2013.01); *G06Q 2220/12* (2013.01); *H04L 2209/60* (2013.01)

(56) References Cited

U.S. PATENT DOCUMENTS

| | | | |
|---|---|---|---|
| 8,601,586 B1* | 12/2013 | Boutros | H04L 63/1433 709/217 |
| 8,898,759 B2* | 11/2014 | Schultz | G06F 21/44 709/203 |
| 2003/0046541 A1* | 3/2003 | Gerdes | G06F 21/31 713/168 |
| 2004/0059908 A1* | 3/2004 | Yamada | H04L 9/003 713/151 |
| 2006/0264202 A1 | 11/2006 | Hagmeier et al. | 455/411 |
| 2007/0094714 A1* | 4/2007 | Bauban | H04L 63/08 726/4 |
| 2008/0134311 A1* | 6/2008 | Medvinsky | G06F 21/33 726/7 |
| 2010/0199089 A1 | 8/2010 | Vysogorets et al. | 713/168 |
| 2011/0055021 A1 | 3/2011 | Haag | 705/14.69 |
| 2013/0318581 A1 | 11/2013 | Counterman | 726/7 |

* cited by examiner

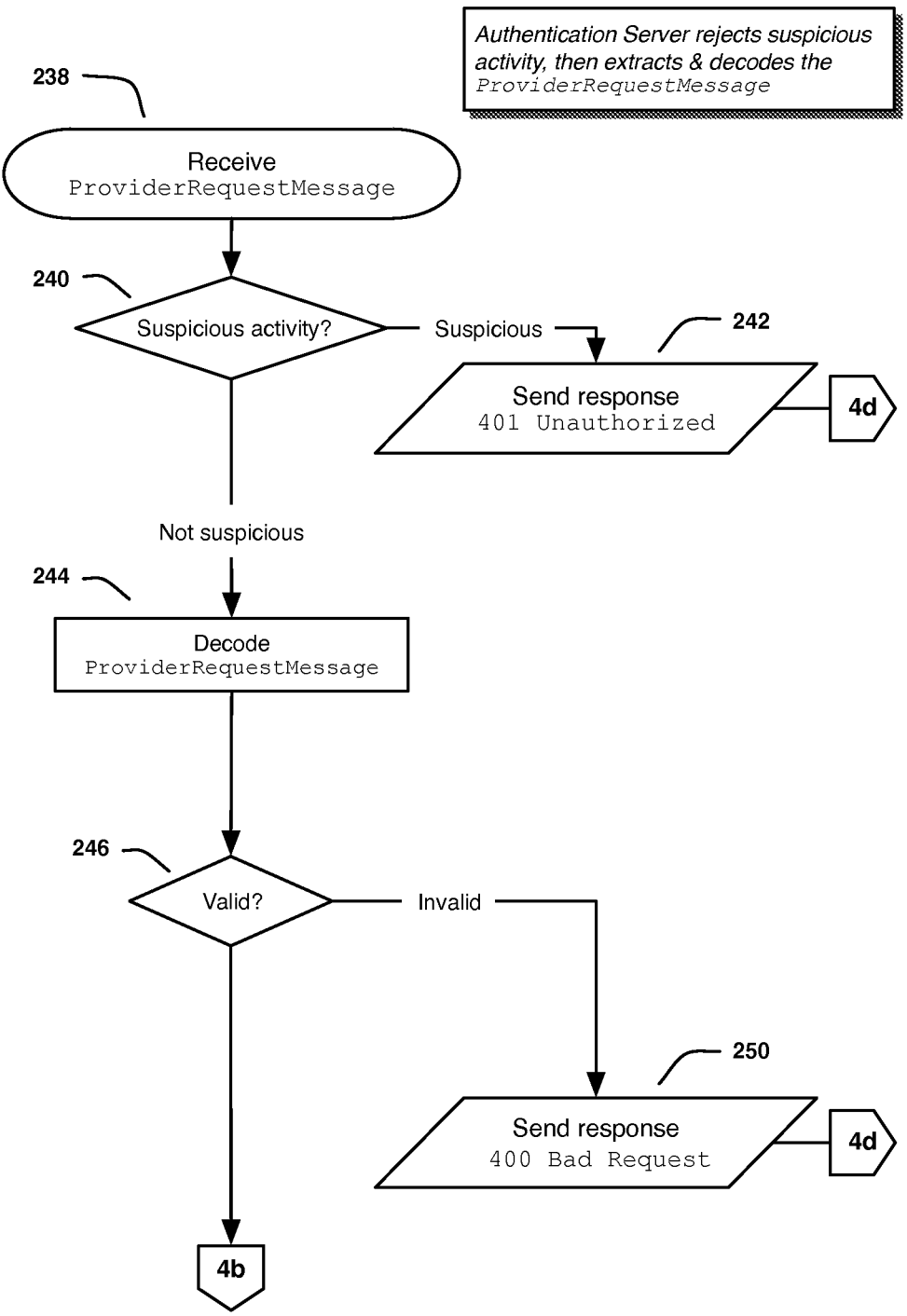

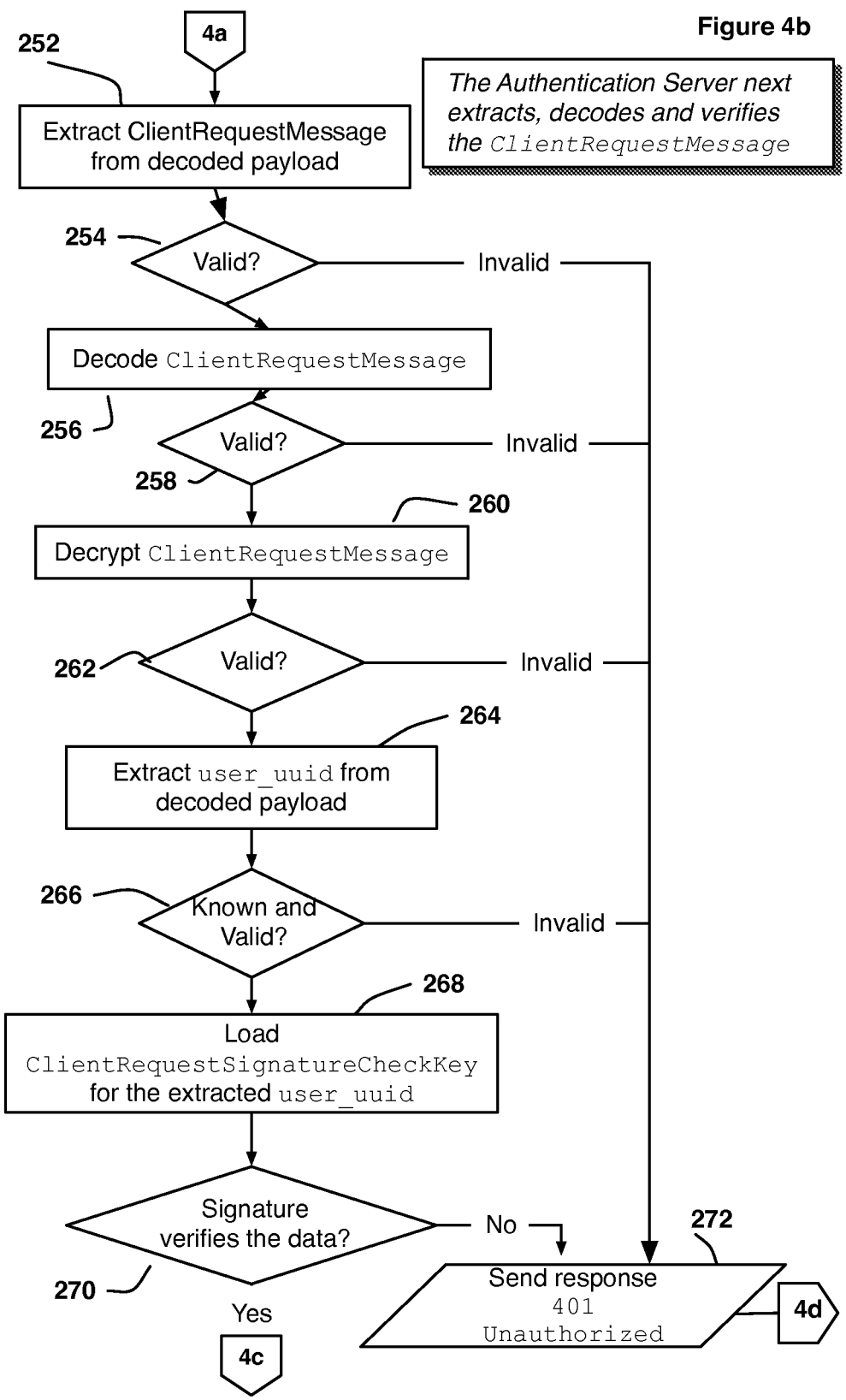

Figure 4c

```
                  ┌──┐     The Authentication Server compares
                  │4b│     request identifying information provided
                  └──┘     by the Service Provider and Client
                    │
                    ▼
        ┌──────────────────────────┐
        │ Extract pub_req_url from │ ─── 274
        │   ProviderRequestMessage │
        └──────────────────────────┘
                    │
                    ▼
        ┌──────────────────────────┐
        │ Extract url_hash from    │ ─── 276
        │   ClientRequestMessage   │
        └──────────────────────────┘
                    │
                    ▼
        ┌──────────────────────────┐
        │        Calculate         │
        │       pub_hash =         │ ─── 278
        │ Crypto.hash( pub_req_url)│
        └──────────────────────────┘
                    │
                    ▼
                   ╱╲  ─── 280
                  ╱  ╲
                 ╱Does╲
                ╱pub_hash==╲
                ╲ url_hash ╱
                 ╲   ?    ╱
                  ╲      ╱
                   ╲    ╱
         Yes,matches│  │No, mismatched
                    │  │
                    │  ▼
                    │  ┌─────────────────┐
                    │  │  Send response  │ ── 282
                    │  │  409 Conflict   │──▶ 4d
                    │  └─────────────────┘
                    ▼
                    ┌─────────────────┐
                    │  Send response  │──▶ 4d
                    │  204 No Content │
                    └─────────────────┘
                              └── 284
```

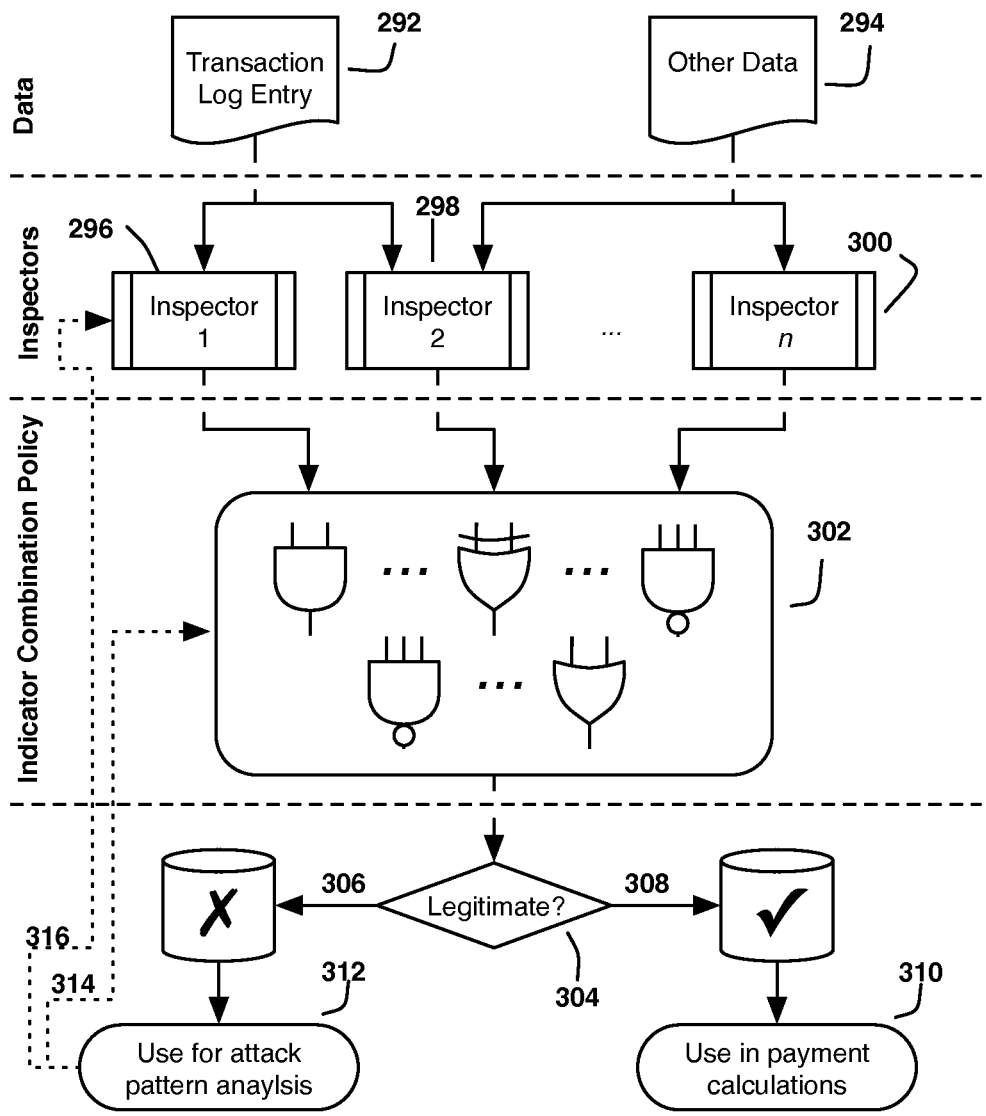

SYSTEM AND METHOD FOR AUTHENTICATING THE LEGITIMACY OF A REQUEST FOR A RESOURCE BY A USER

CROSS-REFERENCE TO RELATED APPLICATIONS

This application is a national stage application of International Patent Application No. PCT/IB2012/056770, filed Nov. 27, 2012. All disclosures of the document(s) named above are incorporated herein by reference.

BACKGROUND OF THE INVENTION

1. Field of the Invention

This invention relates to improvements in systems for authenticating the legitimacy of a request for a resource by a user, and more particularly, to improvements in arrangements where the resource provider receives a fiscal reward from a third party according to the volume of resources accessed by users from each resource/content provider.

2. Description of the Related Art

Hypertext began life with Ted Nelson's Project Xanadu. From the outset, Project Xanadu was intended to include mechanisms for levying very small fees for viewing content: "Every document can contain a royalty mechanism at any desired degree of granularity to ensure payment on any portion accessed, including virtual copies ('transclusions') of all or part of the document." HTML and HTTP currently include no such mandatory, universal payments scheme, though the HTTP 402 Payment Required error code is reserved to allow specialist schemes to be established.

A number of payment schemes have been proposed and businesses launched to address micropayments for HTTP; most have failed and so far none has made substantial inroads into the web at large. Apart from Facebook Credits (which is not usable in the Internet at large), no general-purpose micropayments scheme has emerged for application developers.

Users may be willing to pay money to use a website, application or service, but may object to the annoyances of advertising or the inconvenience of tipping or subscribing to multiple providers. A centralized model offering convenience, security and automation would allow the user to meet these constraints. One such model would be to pay a fixed amount to some third-party service, which would then distribute funds on their behalf to different websites, applications and services according to some formula based in part on usage.

Because this approach melds features of micropayment and subscriptions, the term 'micro subscription' is used to describe it.

An example company that might be characterized as a micro-subscription service is called 'Kachingle'. Another three other companies have previously operated in this area: 'Readability' (subsequently shut down), 'Contenture' (subsequently shut down) and 'In-a-Moon' (which has apparently been inactive since August 2010). A company called 'Flattr' operates a micropayments service on a slightly different model.

All these services use a '2-party protocol' to authenticate that the user has accessed content (e.g. a web page) from a given content provider, or elected to make a micropayment to a given content provider.

The parties in a 2-party protocol are the user browser and a tracking server. The user browser requests some tracking resource (including sending any relevant cookies) from the tracker server. The tracker server may attach cookies to the response.

In the 2-party protocol, the publisher's role is merely to embed some code or a URL provided by the tracking service. It might be a "web bug" or some Javascript that issues an independent request to the tracking server.

The publisher relies on the tracking server to provide a reliable account of visitors to their website.

The naive 2-party protocol and its variants have been widely used on the Internet, for example, by Google Analytics, for visit-tracking purposes. But the introduction of payments relating to visits by users creates a fiscal incentive for malicious users to subvert the protocol, so as to direct undeserved payments by indicating more visitors have used their website, application or service than have actually done so.

As will be appreciated by a person skilled in the art, the 2-party protocol is subversible by publishers because it relies on embedding supplied code or pointing to a URL hosted by the tracker. This scheme is firstly vulnerable to man-in-the-middle attacks. There is also no assurance that the publisher will provide the link, code or resource. For instance, a publisher can simply pose as the browser, fetch javascript from the tracking service to extract any embedded nonces and cookies, and then serve its own malicious javascript to the end user. This is a problem with all 2-party protocols that rely on embedded pure HTTP requests or on Javascript—there is no guarantee that any resource requests came from the user and there is no guarantee that any code provided for execution by the client is trustworthy.

The 2-party protocol is inherently insecure. This undermines the confidence of users of the system that their micropayments or share of a larger subscription fee will be directed to the party that they intended. Likewise, it undermines the confidence of providers that they will receive payment proportional to usage of their services by users.

It is thus desirable to overcome, or at least ameliorate, the security vulnerabilities of the current tracking protocols used by the micro-subscription service providers, to avert criminal or fraudulent activities by persons seeking to subvert such systems for fiscal gain.

The preceding discussion of the background art is intended to facilitate an understanding of the present invention only. It should be appreciated that the discussion is not an acknowledgement or admission that any of the material referred to was part of the common general knowledge as at the priority date of the application.

In example embodiments, a computer system (e.g., a standalone, client or server computer system) configured by an application may constitute a "module" that is configured and operates to perform certain operations In other embodiments, the "module" may be implemented mechanically or electronically; so a module may comprise dedicated circuitry or logic that is permanently configured (e.g., within a special-purpose processor) to perform certain operations A module may also comprise programmable logic or circuitry (e.g. as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed permanently configured (e.g., hardwired) or temporarily configured (e.g., programmed) to operate in a certain manner and/or to perform certain operations described herein.

Throughout the specification unless the context requires otherwise, the word "comprise" or variations such as "comprises" or "comprising", will be understood to imply the inclusion of a stated integer or group of integers but not the exclusion of any other integer or group of integers.

Throughout the specification unless the context requires otherwise, the word "include" or variations such as "includes" or "including", will be understood to imply the inclusion of a stated integer or group of integers but not the exclusion of any other integer or group of integers.

The term 'predetermined steps' or 'predetermined sequence of steps' refers broadly to an agreed protocol comprising two or more steps that must be completed in a set order. For example, during a TCP/IP handshake between two network devices, a series of predetermined steps must be followed, i.e. Host A sends a TCP SYNchronize packet to Host B; Host B receives A's SYN; Host B sends a SYNchronize-ACKnowledgement; Host A receives B's SYN-ACK; Host A sends ACKnowledge; and finally Host B receives ACK. If these predetermined steps are corrected followed, the TCP socket connection is ESTABLISHED.

The preferred embodiment was named the 'Robojar Protocol' during the development phase of the invention, denoting a computer-based system that tracks small contributions from a user to a resource provider. The use of the term 'Robojar Protocol' in the description and drawings, and the content of the headings in this specification, are provided for convenience to assist the reader, and they are not to be interpreted so as to narrow or limit the scope of the disclosure in the description, claims, abstract or drawings.

SUMMARY OF THE INVENTION

An object of the invention is achieved in accordance with the invention, in which a method is provided of authenticating the legitimacy of a request by a user for a resource from a resource provider, including providing an authentication process in which a resource provider message is received and de-assembled; the integrity of the user request message is confirmed by checking the verification string accords to a well-formed structured user message; a result indicator as to the legitimacy of the resource provider message is created by performing two or more authenticity checks, including a first authenticity check that the resource identifier in the structured user message is equal or equivalent to the identified resource in the resource provider message, and a second authenticity check that the user identifier in the structured user message is correlated with a known and valid user, and an authentication result is sent including said result indicator.

Specifically, in accordance with one aspect of the present invention, there is provided a method of authenticating the legitimacy of a request for a resource by a user, the method being executable in an electronic communication system after the following predetermined steps have occurred:
  a structured user message having been created, said structured user message including a resource identifier to identify the resource, and a user identifier to identify the user that is requesting the resource;
  a user verified message having been created, said user verified message at least partially comprising a verification string derived from at least part of the structured user message,
  a user request message having been assembled, said user request message including the user verified message, and the resource identifier to identify the resource being requested of the resource provider,
  the user request message having been sent to a resource provider,
  a process having been run by the resource provider receiving the user request message to create a resource provider message that includes a resource provider identification and the user request message,
said method including the steps of:
  receiving and de-assembling the resource provider message,
  confirming the integrity of the user request message by checking the verification string accords with a well-formed structured user message,
  creating a result indicator as to the legitimacy of the resource provider message by performing two or more authenticity checks, including a first authenticity check that the user identifier in the structured user message is correlated with a known and valid user, and a second authenticity check that the resource identifier in the structured user message is equal or equivalent to the identified resource in the resource provider message, and
  sending an authentication result including said result indicator.

Preferably, the verification string is ciphertext generated using an asymmetric key algorithm.

Preferably, the structured user message including the collation of the structured user message being signed using a signing key A to create a ciphertext signature, and
  the collation of the structured user message and the ciphertext signature then encrypted using an encryption key B resulting in the user verified message being comprised predominantly of a verification ciphertext,
  and the step of confirming the integrity of the user verified message comprises the steps of
  decrypting the user verified message using decryption key B to obtain the structured user message and the ciphertext signature, and
  confirming the integrity of the user verified message by using verification key A on the structured user message to confirm that the ciphertext signature is valid.

Preferably, the structured user message includes a sufficiently unique identifier, to ensure that the collation of the contents of the structured user message is not repeatable.

Preferably, an additional step is provided of creating a log entry in a parseable format, and thereafter parsing and processing the plurality of log entries created over time, to generate zero or more suspicious activity criterion based on analysis of the plurality of log entries.

Preferably, a third authenticity check is performed, to check whether any information associated with the resource provider message matches any of the suspicious activity criteria.

Preferably, the structured user message includes a timestamp of when the request was created, and a timestamp authenticity checker is provided, that checks that the timestamp was generated within a predetermined preceding time period.

Preferably, the step of receiving the resource provider message is conducted over a secure channel, at least in part using a TLS client certificate.

Preferably, the resource is a request for an Internet resource over the IP protocol, and the resource provider message includes the user's IP address.

Preferably, the structured user message includes a device identifier that identifies the device used to generate the structured user message.

In accordance with another aspect of the present invention, there is provided an authentication server operably coupled to an electronic communications network, said authentication server forming part of an authentication system for authenticating the legitimacy of a request for a resource by a user, said authentication system including one or more resource provider servers, arranged to receive a user request message from a user, said user request message comprising a user verified message and a resource identifier that identifies the resource being requested, and said one or more resource servers operable to create and forward to one or more authentication servers a resource provider message including a resource provider identifier, the resource identifier and said user verified message, said user verified message comprising a structured user message including a user identifier and said resource identifier, said user verified message at least partially composed of a verification string derived from at least part of the structured user message, said authentication server having a verification module, operable to receive said resource provider message as an input, and said verification module, arranged to confirm said verification string accords with a well-formed structured user message according to [1] predetermined criteria, said authentication server having a first authenticity module arranged to determine whether the resource identifier of the structured user message is equal or equivalent to the identified resource in the resource provider message, said authentication server having a second authenticity module to determine whether the user identifier in the structured user message is a valid user identifier, said authentication server having an authenticity determinator to generate an authentication result including a result indicator as to the legitimacy of the resource provider message based on the result of a verification module and one more authenticity modules, and said authentication server having a communications means to receive a resource provider message, and return an authentication result determined by said authenticity determinator.

Preferably, the verification string is ciphertext generated using an asymmetric key algorithm.

Preferably, the predetermined criteria of said verification module, comprises decrypting the user verified message using decryption key B to obtain the structured user message and a digital signature, the digital signature having been creating by a signing key A held by the user, said user verified message having been encrypted by an encryption key B held the user, and confirming the integrity of the user verified message by applying verification key A against the structured user message, to confirm that the digital signature is valid.

Preferably, the structured user message includes a sufficiently unique identifier, to ensure that collations of the contents of the structured user message are not repeatable.

Preferably, the authentication system includes a logging module, to store log entries in a parseable format, and a log processing module, to thereafter parse and process the plurality of log entries created over time by the logging module, to generate zero or more suspicious activity criterion based using a classification analysis processor.

Preferably, each log entry includes a digital signature, to create an unforgettable log entry.

Preferably, the authentication server includes a third authenticity module to determine whether any information associated with the resource provider message matches any of the suspicious activity criteria.

Preferably, the structured user message includes a timestamp of when the request was created, and a timestamp authenticity module is provided, that checks that the timestamp was generated within a predetermined preceding time period.

Preferably, said communications means utilizes a secure communications channel, in part using a TLS client certificate.

Preferably, the resource is a request for an Internet resource over the IP protocol, and the resource provider message includes the user's IP address.

Preferably, the structured user message includes a device identifier that identifies the device used to generate the structured user message.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4a-d is a flowchart of an authentication system according to an embodiment of the invention, FIG. 5 is an process diagram of the Robojar suspicious activity criteria generator.

DETAILED DESCRIPTION OF THE EMBODIMENTS

Figure 1:
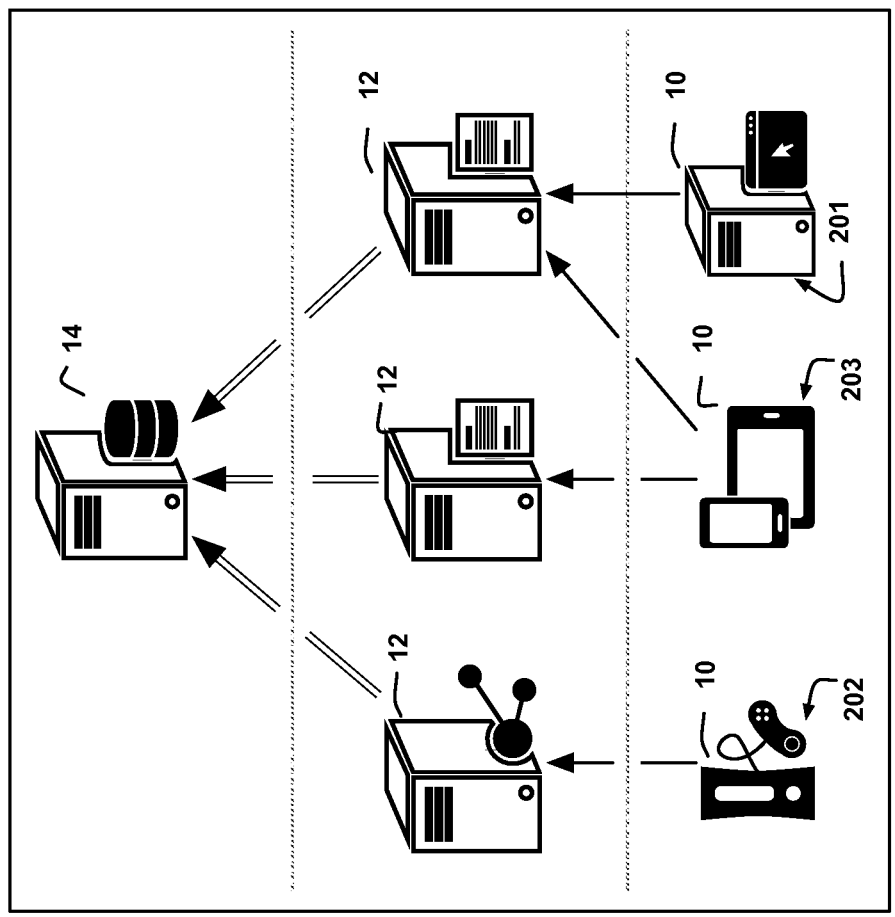
FIG. 1 is an overview of parties that may utilize an authentication system according to an embodiment of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 6:
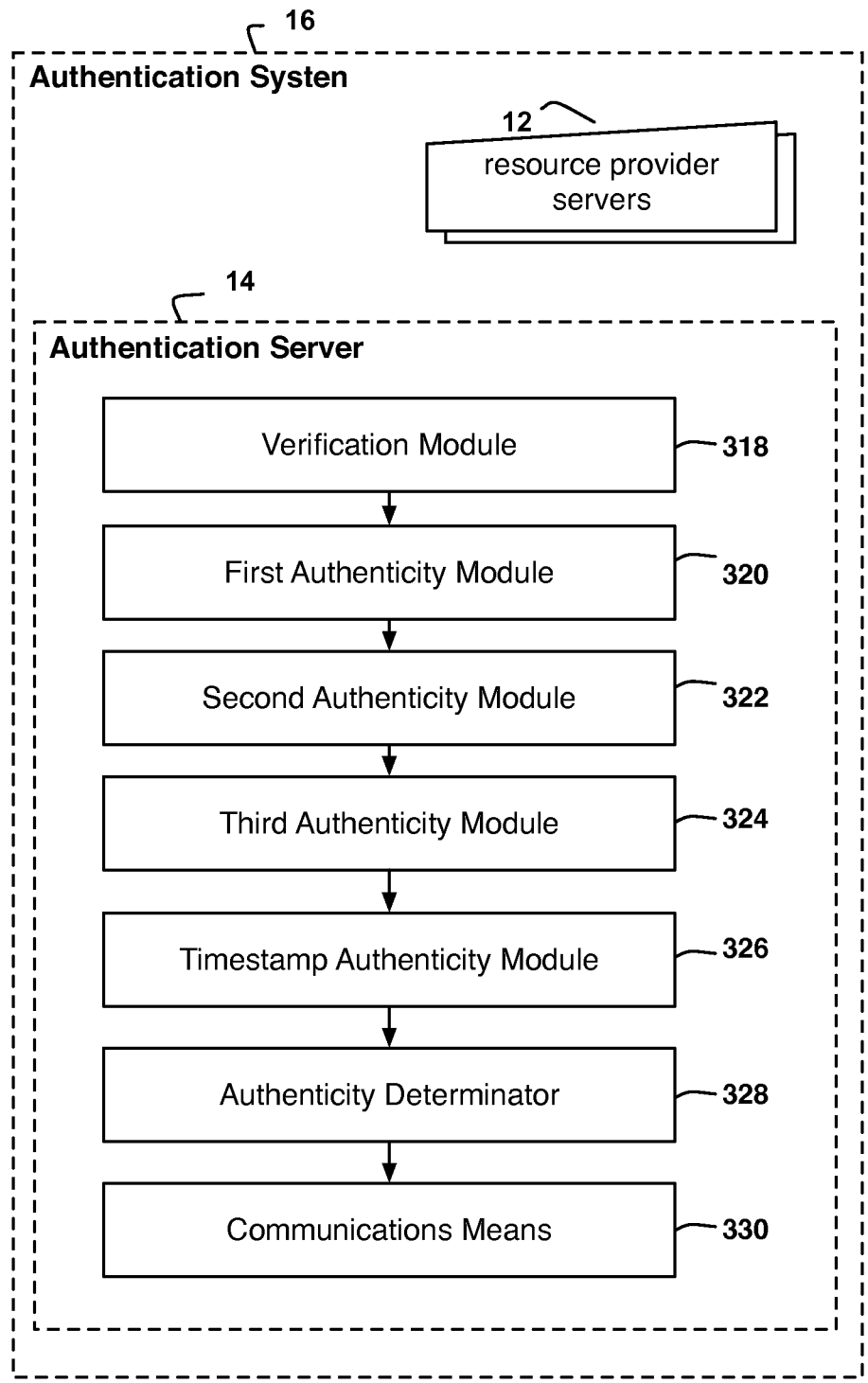
FIG. 6 is an overview of the authentication server according to an embodiment of the invention.

An embodiment of the present invention will now be described with reference to FIGS. 6 and 7 of the drawings. The components of the authentication system 16 will be described in detail, followed by a detailed description of the steps outlined in FIG. 7.

In these figures, there is shown an authentication system 16. The authentication system 16 is operably coupled to an electronic communications network. In the present embodiment, the electronic communications network is the Internet network.

The authentication server 14 forms part of an authentication system 16, for authenticating the legitimacy of a request for a resource by a user. The request for a resource described in the preferred embodiment is a request for a file from a web server. This could, for example, be a request for a HTML file, an XML file or an image file. The resource is not limited to files, and could be anything that might be of benefit to a user such as a computation or sequence of computational interactions such as a computer game.

The authentication system 16 includes one or more resource provider 12 servers, arranged to receive a user request message from a user. In the present embodiment, the resource provider 12 is in the form of a web server that publishes content, such as news articles. The user request message is sent via the user's web browser to the web server, in the form of a HTTP request, as defined in RFC 2616.

The user request message has a user verified message and a resource identifier that identifies the resource being requested, and the web server in turn creates and forward a resource provider message including a resource provider identifier and the user request message.

The user verified message includes a structured user message in the form of a plaintext string wherein fields are delimited using the pipe (T) character. The string includes a user identifier and the resource identifier. The user verified message is at least partially composed of a verification string correlated with the structured user message. The verification string is ciphertext generated using an asymmetric key algorithm. The structured user message includes a digital signature, the digital signature having been creating by a signing key A held by the user.

It is preferable to encrypt the entire structured user message to create the user verified message. In this regard, an encryption key B held the user can be used to encrypt the structured user message into a ciphertext. A protocol version number is prepended to the message, with the delimitation between version number and the encrypted structured user message given by the pipe character. The protocol version number allows the protocol to be easily and safely updated in future. It is transmitted in plaintext because the encryption algorithm or structure of the user message may change between protocol versions.

The structured user message also includes a timestamp of when the request was created, stored in the message as field 'req_time' (described further below).

When the user verified message, also referred to herein as the 'payload', is received by the authentication server 14, a corresponding decryption key B is used to reveal the contents of the structured user message.

Inside the encrypted payload, the contents of the structured user message are accompanied by a digital signature (also referred to as simply a signature). The digital signature serves two purposes. The signature first ensures that the contents of the structured user message have not been altered during transmission from the client to the authentication server 14. The signature secondly proves that the structured user message was generated by the client and not some other party.

The authentication server 14 is able to cryptographically assure these properties because the client generates the digital signature using the signing key A which is known only to the client. The authentication server 14 has a verification key A which can be used to perform the asymmetric verification process.

In the form of the HTTP request created by the web browser of the user, the following format is used:

The client adds an additional HTTP header to the HTTP request. The additional header is given a name unique to the protocol. For example, the header name could be 'ROBO-JAR_REQ:'. The header data is the complete concatenated string (protocol number, pipe character and payload) described above.

In theory, there are a number of ways a message could be sent to the resource provider. For example, the client might append it to the URLs in GET requests or as part of the message body in a POST request. In this design, we instead include the message as a custom header included in the HTTP header block.

By way of explanation: in any network protocol, there is always a requirement to have two distinct components: a channel for commands, and a channel for data. How these are distinguished from each other, and at which layer (physical, network, transport, application etc.) they are separated from each other, varies from protocol to protocol. In HTTP, the command channel is "in band" with the data channel, with separation achieved by sending the command channel (the "header block") before any data (the "body").

Most network protocols tend to include some mechanism for adding new commands to the command channel without breaking the existing protocol. In HTTP, the mechanism for doing so is to add new HTTP headers. Adding a custom HTTP header is a non-breaking extension: HTTP servers which do not recognize a custom header will ignore it; HTTP headers which recognize the custom header can act on it.

If instead the Robojar protocol tried to extend HTTP in some other way (such as the GET/POST-extending examples given above), this may be a protocol-breaking decision. That is, HTTP servers which are not configured for the Robojar protocol may behave incorrectly in these situations, because the extension is affecting a part of the HTTP protocol which was not meant to be extended in such a fashion. For example, appending a structured user message to the URL of a GET message could easily cause 404 Not Found responses to be issued by HTTP servers that do not recognize the appended message or its purpose.

The design principle of inserting the structured user message into the extension mechanism of a network protocol command channel can be generalized to any such protocol or format where an adaptation of this invention is applied.

The full structure of the structured user message, described in pseudocode, is as follows:

```
user_uuid       = get_robojar_user_id( )
dev_uuid        = get_device_uuid( )
browser_req_uuid = UUID.new(:v4)
browser_req_url = Browser.request[:URL]
req_time        = Time.now( )
url_hash = Crypto.hash( browser_req_url )
data     = user_uuid | dev_uuid | browser_req_uuid | url_hash | req_time
signature = Crypto.sign( BrowserRequestSignatureKey, data )
payload   = Crypto.encrypt( RequestEncryptionKey, data | signature )
ClientRequestMessage =
PROTOCOL_VERSION | Base64Url.encode( payload )
```

Where:
    user_uuid is a UUID v4 identifier specifically identifying
        a particular user;
    dev_uuid is a UUID v4 identifier specifically identifying
        a particular client device;

browser_req_uuid is a UUID v4 specifically identifying the particular request; browser_req_url is the URL for the resource or service being requested during this HTTP request;

req_time is the current time given by the client's system clock;

url_hash is a one-way cryptographic message digest (aka "hash") of the browser_req_url. The hash algorithm and parameters are not here specified. The URL is hashed to reduce it to constant size before transmission. Because the hash algorithm does not require any shared or paired keys, it can form a compact, fixed-size representation of any URL, because the hashing algorithm can be applied to the URL subsequently supplied by the Resource Provider and the results compared for equivalency;

data is a string generated by concatenating user_uuid, dev_uuid, browser_req_uuid, url_hash and req_time. Fields are delimited using the pipe character cp. This enables reliable parsing and prevents attacks based on creating multiple plaintexts that reduce to an identical hash (as hashing is one step in the formation of a digital signature);

signature is a string created by applying the client's secret signing key to the data using a digital signature algorithm. The digital signature algorithm and parameters are not here specified;

payload is a string created by applying the authentication server's public encryption key B to a string formed by concatenating the data and signature, with the data and signature delimited using the pipe character;

ClientRequestMessage is a string created by concatenating the protocol version number to a string generated by applying the Base64Url encoding to the payload. The pipe character is chosen here because it does not appear in the Base64Url encoding, and so forms a reliable delimiter for between the protocol number and the Base64Url-encoded payload. It is the ClientRequestMessage that will be transmitted in the HTTP header appended to the client's HTTP requests.

The Base64Url encoding is used in several places because it will correctly and safely encode any characters, including characters that might otherwise be used to create attacks through escape sequences embedded in a URL. The text generated by the Base64Url encoding is guaranteed not to include the pipe ('|') character, meaning that when a subfield is Base64Url encoded, it can be concatenated with other fields safely using the pipe character.

In the case of the final encoding before transmission, Base64Url is used instead of "percent encoding" (see below) because HTTP headers may contain any text character, and Base64Url creates more compact representations of input texts than percent encoding does.

The HTTP request includes a sufficiently unique identifier in the form of the browser_req_uuid, to ensure that the ClientRequestMessage is not repeated. This means that replay attacks against the protocol are not possible.

As described above, the digital signature is a cryptographic signature using a signing key A to create a ciphertext signature. The collation of the structured user message (data) and the ciphertext signature (signature) is encrypted using an encryption key B to create the user verified message comprised predominantly of a verification ciphertext (the payload). In the preferred embodiment, the PROTOCOL_VERSION is included in the user request message.

The user request message, in the form of the HTTP request, using the HTTP request to identify the resource, e.g. GET http://www.example.com/ or POST http://example.com/post/1

Asymmetric or "dual-key" cryptography is used for the signature instead of symmetric methods such as HMACs. In a symmetric signature method, a signature is generated based on a key shared between two parties. Symmetric signature schemes have the advantage that they are typically much faster than asymmetric schemes.

However, in a symmetric scheme, if an authentication server is compromised, every single user signature key is compromised. That is, in a symmetric signing scheme, an attacker who compromises an authentication server will be in a position to pose as any user, because the keys held by the authentication server are the same keys used by users to sign messages. With the asymmetric scheme chosen, if an authentication server is compromised, the attacker will still be unable to pose as any user, because they do not have the secret signing key.

The structured user message includes a device identifier that identifies the device used to generate the structured user message. This could be useful to the classification analysis processor (described below).

Upon a resource provider 12 server receiving a user request message from a user, the resource provider 12 firstly abstracts the resource of interest from the request. A list of explanatory examples of resources of interest is as follows: a web page, a web site, an online gaming service, a service accessible via HTTP, a protocol to log into a remote session or service (such as a terminal, database or a game server), a remote procedure call to particular object running on the resource provider's network, or any service or resource addressable with a URI (RFC 3986).

The resource provider 12 server in turn creates a resource provider message that includes the resource identifier in the form of a URL, the user verified message, and an identifier of the resource provider 12 sending the message, so that the authentication server 14 can subsequently allocate rewards or benefits for proving the resource to the user. The identifier of the resource provider could be contained in the resource identifier for example, the server address portion of the URL. The present embodiment uses a unique pre-allocated key previously provided to the given resource provider 12.

Continuing with the example of the HTTP request received from the user, a new resource provider message in the form of a subsequent HTTP request is created, which will be sent to the authentication server 16.

The full structure of the resource provider's message, described in pseudocode, is as follows:

```
pub_req_url     = Base64Url.encode( HTTP_API.REQUEST[:URL] )
client_ip       = HTTP_API.REQUEST[:client_address]
pub_req_time    = Time.now( )
client_req_msg  = HTTP_API.HEADERS[:ROBOJAR_REQ]
ProviderRequestMessage =
HTML_API.form_encode( PROTOCOL_VERSION, pub_req_url,
client_ip, pub_req_time, client_req_msg )
```

Where:
pub_req_url is a string generated by applying the Base64Url encoding to the URL requested by the client;

client_ip is the IP address of the client making the HTTP request (as the user's request is for an Internet resource provider's over the IP protocol, the resource provider message can include the user's IP address);

pub_req_time is the current time given by the resource provider's system clock;

client_req_message is the client-generated message sent to the resource provider in the appended 'ROBOJAR_REQ:' HTTP header;

ProviderRequestMessage is a string generated by applying the application/x-www-form-urlencoded scheme to the protocol version number, pub_req_url, client_ip, pub_req_time and client_req_msg. This encoding scheme describes its own mechanism for delimiting fields and encoding special characters, so unlike the ClientRequestMessage we do not need to define delimiters, encodings etc.

The HTTP_API is a short-hand notation to refer to common web/HTTP API patterns found in for example PHP (e.g. the information that can be found in a "super global" variable in PHP, or the Environment variable in Ruby/Rack), whereby the HTTP_API.REQUEST abstracts access to the request or header fields, whereby the underlying HTTP request may be a GET and POST request.

ProviderRequestMessage is the resource provider message that is sent to the Authentication Server. The message is transmitted to the Authentication Server over a secure channel using TLS (the combination of TLS and HTTP is often referred to as HTTPS). The identity of the resource provider is authenticated using TLS client certificates.

Using TLS (Transport Layer Security—previously known as SSL or Secure Sockets Layer) as a secure channel means that the component of the protocol between the resource provider and the Authentication Server can be simplified. TLS provides end-to-end encryption, resistance to tampering, inspection, man-in-the-middle and message-replay attacks; hence we do not need to provide these assurances ourselves.

TLS client certificates allow the Authentication Server to authenticate the identity of the resource provider during the resource message component of the transaction, without needing to provide additional UUIDs or signatures.

The resource provider message is transmitted using the HTTP POST method with the application/x-www-form-urlencoded encoding. POST is chosen as the HTTP method to use for an operation where information is forwarded to a server where a range of responses might ensue. The other common HTTP method, GET, does not describe the situation where information is being forwarded for storage. By definition, any parameters provided during a GET request are meant only to identify the resource being requested and are meant to be discarded after the HTTP server has responded. Finally, if a resource provider inadvertently exposes its internal Robojar processes (due to, for instance, a defective 3rd party module claiming to conform to this design), it may be possible to inadvertently trigger incomplete requests to the Authentication Server. If such an exposure takes the form of URLs, the principal danger is that a web crawler or indexer may repeatedly issue GET requests to the URL, possibly causing a false positive identification of an attack pattern. However, web crawlers don't issue POST requests, as this would be non-conformant with the meaning of that HTTP method.

The application/x-www-form-urlencoded encoding is defined as part of HTML, not HTTP per se. The description application/x-www-form-encoded is the value given for the Content-Type header of the POST request. This encoding, sometimes called "Percent Encoding", is universally implemented by HTTP clients and servers. It defines a method for delimiting data fields and for encoding special characters that would otherwise break the transmission and/or parsing of HTML and HTTP requests. Setting this Content-Type header means that the POST request can be sent in the HTTP request body, not as part of the request message header block. This means that the POST can be of arbitrary size. This is important because, as was noted above, URLs may be very long.

The authentication server 14 includes a verification module and an authenticity determinator.

The verification module 318 receives the resource provider message as an input (at 334), and performs the step of confirming said verification string accords with the contents of the structured user message according to a predetermined criteria.

In the sequence described below, the authenticity determinator 328 uses a sequence of steps to determine generate an authentication result (at 346) including a result indicator as to the legitimacy of the resource provider message in the form of a HTTP status code. The "204 status code" is an indicator that the request is authentic and authorized. The "401 status code" is an indicator that the request is inauthentic or unauthorized. If additional information is to be transmitted, for example, a differentiated level of authorization (limited, full access etc), then it is preferable to use a 200 "status code", and then include both the result indicator and the additional information in the content of the response.

In the present embodiment, the Authentication Server 14 acts to process the resource provider message 238. With the preparatory elements at 332 completed, the Authentication Server 14 proceeds as follows:

1. The request is examined for suspicious behavior 240 by the third authenticity module 324. It checks whether any information associated with the resource provider message matches any of the suspicious activity criteria that may have been generated during previous classification and analysis 312. For example, if a client IP address matches a suspicious activity criteria of a blacklisted IP address, being those IP addresses having been identified by the classification analysis processor as having recently made repeated attempts to subvert the Robojar protocol. In addition, it may know of suspicious patterns based on activity, for example, by the speed and volume of the requests being made for a given resource. If any (or all) suspicious activity criteria is found to be satisfied, the Authentication Server replies to the resource provider with the 401 Unauthorized status code 242 (e.g. at 338), generates a log entry 286, signs the log entry 288 and stores the log entry 290. Otherwise, the authenticity determinator proceeds (e.g. also at 338).

2. The resource provider message is decoded by reversing the application/x-www-form-urlencoded encoding 244. If this step fails 246, the Authentication Server replies with the 400 Bad Request status code 250, generates a log entry 286, signs the log entry 288 and stores the log entry 290. Otherwise the algorithm proceeds. The design rationale of reversing the encoding, inter alia, is discussed above.

3. The verification module 318 proceeds to extract the user request message from the resource provider message 252. If this step fails 254, the authentication result is 401 Unauthorized status code 272, generates a log entry 286, signs the log entry 288 and stores the log entry 290. Otherwise the algorithm proceeds.

4. The user message is next decoded 256. Decoding is performed firstly by identifying the encoded and encrypted component by using the pipe character (y) delimiter. Then the encoded and encrypted component is decoded by reversing the Base64Url encoding. If this step fails 258, the Authentication Server replies to the resource provider with the 401 Unauthorized status code 272, generates a log entry 286, signs the log entry 288 and stores the log entry 290. Otherwise the algorithm proceeds (at 334).

5. The user message is decrypted 260. Decryption is performed using the Authentication Server's private decryption key B. If this step fails 262, the Authentication Server replies to the resource provider with the 401 Unauthorized status code 272, generates a log entry 286, signs the log entry 288 and stores the log entry 290. Otherwise the algorithm proceeds.

6. The user_uuid field is extracted from the decoded, decrypted data 264. The second authenticity module 322 proceeds check if the user identifier in the structured user message is a valid user identifier (at 342). If this step fails because the user_uuid is unknown or invalid 266, the Authentication Server replies to the resource provider with the 401 Unauthorized status code 272, generates a log entry 286, signs the log entry 288 and stores the log entry 290. Otherwise the algorithm proceeds.

7. The Authentication Server uses the user_uuid field as an index to look up the verification key for the user's signature key 268.

8. The Authentication Server verifies the signature 270. The verification module 318 performs the verification using the signature verification algorithm that corresponds with the signature generation algorithm applied during the creation of the user request message. If this step fails because the signature is invalid, the Authentication Server replies to the resource provider with the 401 Unauthorized status code, generates a log entry 286, signs the log entry 288 and stores the log entry 290. Otherwise the algorithm proceeds (at 336).

9. The pub_req_url field is extracted from the resource provider message 274.

10. The url_hash field is extracted from the user request message 276.

11. The Authentication Server generates a string by applying a one-way cryptographic message digest function ("hash") to the pub_req_url field. The algorithm and parameters used are the same as those used while generating the url_hash field of client request message 278.

12. The first authenticity module 320 compares the string generated to the url_hash field of the client request message. If the two strings are not identical 280, the Authentication Server replies to the resource provider with the 409 Conflict status code 282, generates a log entry 286, signs the log entry 288 and stores the log entry 290. Otherwise the algorithm proceeds (at 340).

13. The timestamp authenticity module 326, checks the req_time parameter (not shown in FIG. 4), that the timestamp was generated within a predetermined preceding time period. A preceding time period of one hour is preferred. If it was created more than one hour subsequent to req_time, the Authentication Server replies to the resource provider with the 401 Unauthorized status code (at 344).

14. The Authentication Server replies to the resource provider via the communications means 330 with the 204 No Content status code 284, generates a log entry 286, signs the log entry 288 and stores the log entry 290.

The predetermined criteria of the verification module 318 may include additional requirements, such as for example the inclusion of a static string, the naming of a header field, or the order of the fields in the request.

The Authentication Server 14 has a first authenticity module arranged to perform the step of determining that the resource identifier of the structured user verified message is equal or equivalent to the identified resource in the resource provider message.

When establishing equality or equivalence, one or both of resource identifiers sent by the user message and the resource provider message may be transformed in some way to provide a uniform, canonical representation. This may be because one or both of the user or resource provider may have sent the resource identifier in a transformed format, requiring the other party's copy of the information to be transformed before the comparison step can occur.

The authentication server 14 having a second authenticity module to check that the user identifier in the structured user message is a valid user identifier.

The authentication server 14 has an authenticity determinator to generate an authentication result including a result indicator as to the legitimacy of the resource provider message based on the result of a verification module and one or more authenticity modules.

The authentication system includes a logging module, to store log entries in a parseable format, and a log processing module, to thereafter parse and process the plurality of log entries created over time by the logging module, to generate zero or more suspicious activity criterion based using a classification analysis processor. Each log entry includes a digital signature, to create an unforgettable log entry.

Because the classifier is separate from the authentication system and/or any log repositories, digitally signing log entries adds important assurances. It assures that tampering with log entries can be detected. It allows verification that a particular log entry was generated by a particular authentication system. Such entries would be unforgettable by the classification system; so if, for example, a classification system were compromised, it would be unable to forge log entries without being subject to detection by an independent audit. Alternatively, if a particular authentication server is compromised, it is possible to reliably discard log entries from that server, because log entry signatures will reliably indicate which servers produced which log entries.

The resource provider messages that were considered to have a false or a low result indicator, i.e. denoting that the message was unauthorized or likely unauthorized respectively, are equally valuable as true or a high result indicator, for the purposes of detecting patterns that an attacker may use to circumvent the authorization server.

Accordingly, following receipt of each and every resource provider message, the logging module stores digitally signed log entries. Log entries can be stored in a relational database, as structure plain text appended to a text file, as information forwarded to standard "syslog" tools such as syslog-ng or Windows Event Log.

Although in the present embodiment the logging module is located on the same server hardware as the authentication server 14, it would be feasible for the logging module to be located anywhere within the authentication system 16. Log entries could be forwarded to a specialist log repository immediately after being created and signed, or they could be grouped into batches and transmitted periodically. As described above, in the present embodiment, the authentication result is sent as a HTTP status code.

A timestamp authenticity module is also provided by the authentication server 14, that checks that the timestamp was generated within a predetermined preceding time period. The preceding time period should account, at least to an extent, for the issues of latency, processing time, and the fact that system clocks cannot be assumed to be synchronized. Therefore, the time allowed may be liberal, e.g. 5 minutes, but preclude a request that is 10 days old. This requirement may also be relaxed, if for example the classification analysis processor reveals that an unacceptably high number of users appear to have a machine reporting a time near to unix epoch, which may indicate that the PRAM battery in many of the user's computer is flat.

A third authenticity module is also provided, for checking whether any information associated with the resource provider message matches any of the suspicious activity criteria, as identified above by the classification analysis processor. Suspicious activity constitutes any pattern of traffic or messages that has been found by analysis of log entries and other analysis indicators to be correlated with unwanted behavior. For example, some forms of traffic may be correlated with attempts to launder money using the business. Rules derived from analysis during classification could be applied to identify these transactions while they are occurring and terminate further processing as described above.

The authentication server 14 has a communications means in the form of a network adapter provided the transport layer of a TCP/IP stack, to receive the resource provider message, and return a structured HTTP request, as would be appreciated by a person skilled in the art. An authentication result determined by the authenticity determinator is returned in the HTTP response. The indicator is expressed using one of four standard HTTP response codes. In the present embodiment, the following status codes are adopted:

- 204 No Content. This status code indicates to the resource provider that the user is a known and valid user. 204 No Content is chosen because this response requires no HTTP body to be sent, reducing traffic between the resource provider and the Authentication Server. When receiving this status code, the resource provider may optionally change the HTTP response it will send to the client. For example, it may grant access to a web page, suppress advertisements, redirect to another page etc.
- 200 OK. This status code indicates to the resource provider that the user is a known and valid user, and to provide additional information in the response body. For example, if there are multiple subscription levels (eg "Robojar Standard", "Robojar Gold" etc), the response body can include a token to indicate the user's subscription level (eg "STD", "GOLD"). Other information may be returned to the resource provider as well. When receiving this status code, the resource provider may optionally change the HTTP response it will send to the client. For example, it may grant access to a web page, suppress advertisements, redirect to another page etc. The 200 OK response can be substituted for the 204 No Content response anywhere in this document or in accompanying diagrams without changing the semantics or operation of the protocol generally. In cases where no additional information needs to be forwarded to a resource provider, 204 No Content would be chosen as the response.
- 400 Bad Request. This status code indicates that the resource provider's message was invalid according to the authenticity processes described above. The resource provider should take this response as an indicator that their implementation of the protocol may be defective. The resource provider may, at their discretion, elect to treat this response as if were a 204 No Content.
- 401 Unauthorized. This status code indicates to the resource provider that the user is not known and not valid. When receiving this status code, the resource provider may optionally change the HTTP response it will send to the client. For example, it may refuse access to a web page.
- 409 Conflict. This status code indicates that the resource identifier supplied by the client was different from the resource identifier supplied by the resource provider. When receiving this status code, the resource provider may optionally change the HTTP response it will send to the client. For example, it may refuse access to a web page.

With reference to FIG. 1, a first example at 202 is provided whereby a Robojar user 10 is using a game console is communicating with a game resource provider 12 operated by a game company, using a proprietary networking protocol. The user game console 10 and game resource provider 12 utilize the Robojar protocol to ensure that the user is sufficiently authorized.

A second example is provided at 203, whereby a Robojar user 10 is using a mobile web browser, and with a Robojar plugin installed, visits multiple resource providers 12.

A third example is provided at 201, whereby a web service relies in part on content from a resource provider 12 in the form of other websites. The upstream publisher resource provider 12 supplies its content to authenticated users 10 only. The downstream web service is in this example acting as a Robojar user 10, using a programming library to generate the user request message. In this case, the web service acts as a client 10, to generate a user request message and access a resource from the resource provider 12.

In all of these examples, the client or resource provider might additionally record and forward to Robojar other information, such as time spent on a web page, time spent playing a game, volume of traffic or any other information that can be derived from a network session or request.

Following classification of records, Robojarr is thereafter able to calculate the provision of payments or other rewards based in part on the number and kind of requests made to each resource provider 12.

As would be appreciated by the reader, it is advisable to generate new cryptographic keys periodically. Such rotations or revocations should occur on a regular scheduled basis, with consideration of ad hoc rotations or revocations should the need arise.

Although a few embodiments of the present invention have been shown and described, it would be appreciated by those skilled in the art that changes may be made in this embodiment without departing from the principles and spirit of the invention, the scope of which is defined in the claims and their equivalents.

Summary of the Robojar Protocol

Figure 2:
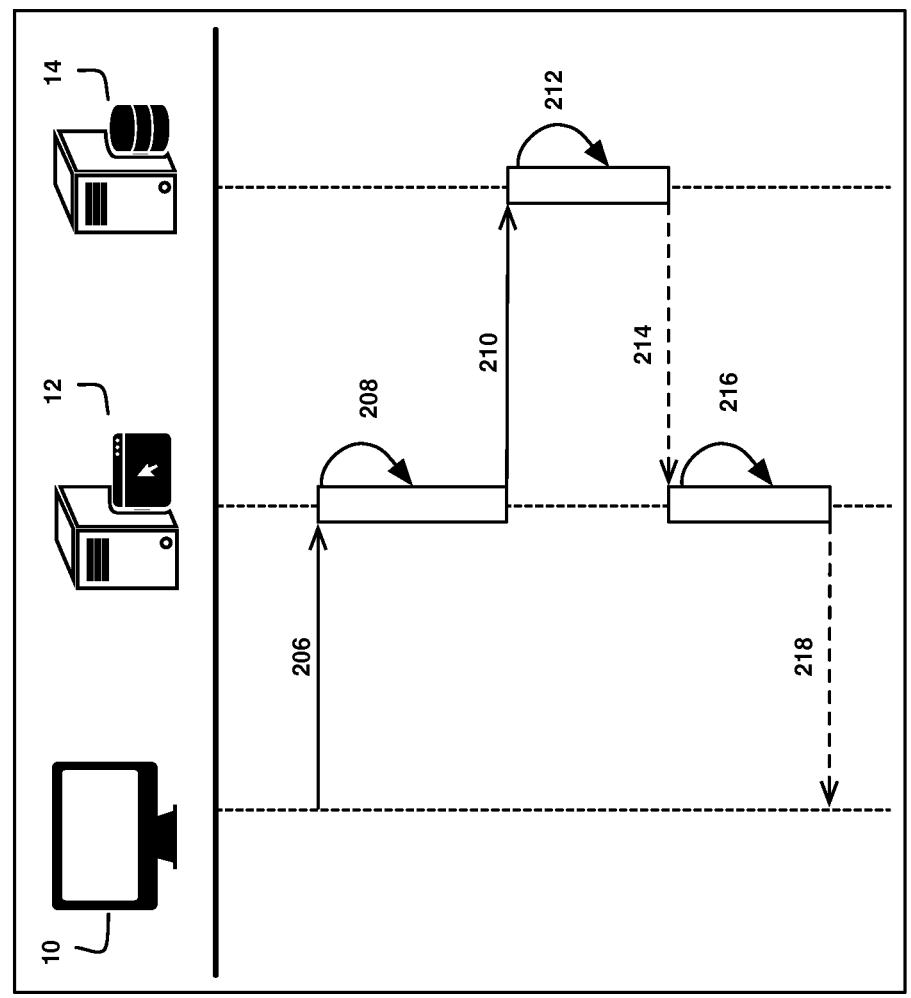
FIG. 2 is a sequence diagram of authenticating the legitimacy of a request for a resource by a user according to an embodiment of the invention.

FIG. 2 illustrates the general abstract design of the Robojar Protocol.

1. A client 10 makes a request 206 for a resource or service from the resource provider 12. The request includes the user request message.
2. The resource provider 12 prepares a resource provider message 208, based in part on the user request message.
3. The resource provider forwards its message 210 to the Authentication Server 14.

4. The Authentication Server 14 examines the messages 212 and issues a response 214 to the resource provider. The response indicates whether or not the user message was from a known and valid Robojar user.
5. Based on the Authentication Server's response, the resource provider may change its response or behavior 216 when responding to the client 218.

Figure 3:
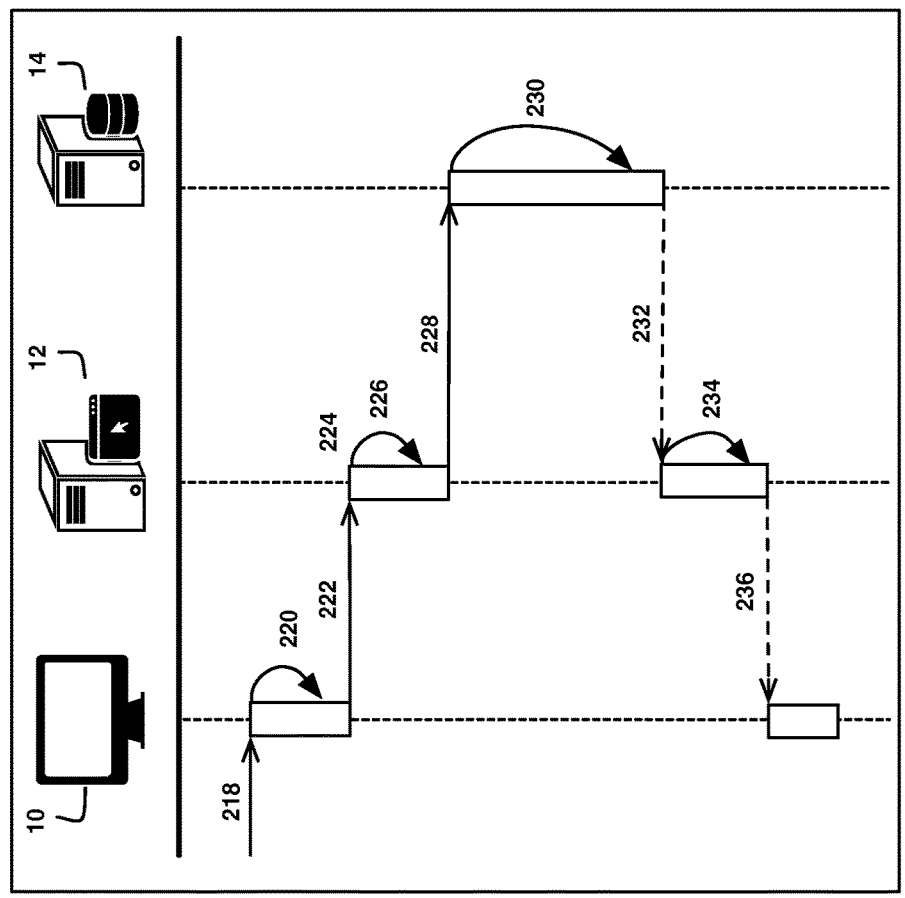
FIG. 3 is a sequence diagram of authenticating the legitimacy of a request for a resource by a user via the HTTP network protocol according to an embodiment of the invention.

FIG. 3 illustrates a particular design of the Robojar Protocol, applied to HTTP. In the diagram, the user 10 is operating a Browser with an installed software module supplied by Robojar and the resource provider 12 is operating a HTTP server with a module supplied by Robojar.

1. By clicking a link or button, or by pressing the enter key, the user 10 triggers a GET or POST 218. The Browser generates a user request message 220. The Browser issues the request 222, appending ROBOJAR_ REQ: and the request message to the normal HTTP request headers.
2. The resource provider 12 recognizes the ROBOJAR_ REQ: header 224.
3. The resource provider 12 prepares a resource provider message 226 based in part on the user request message it has received.
4. The resource provider 12 POSTs its message the Authentication Server 14 over HTTPS 228, using the application/x-www-form-urlencoded encoding.
5. The Authentication Server 14 carries out the authentication process 230 described above and shown in FIG. 4.
6. The Authentication Server 14 responds 232 to the resource provider 12, with the response code chosen in the authentication process 230 described above and shown in FIG. 4.
7. The resource provider 12 may at its discretion modify its behavior 234 based on the Authentication Server's response 232.
8. The resource provider 12 responds 236 to the client 10.

Figure 4D:
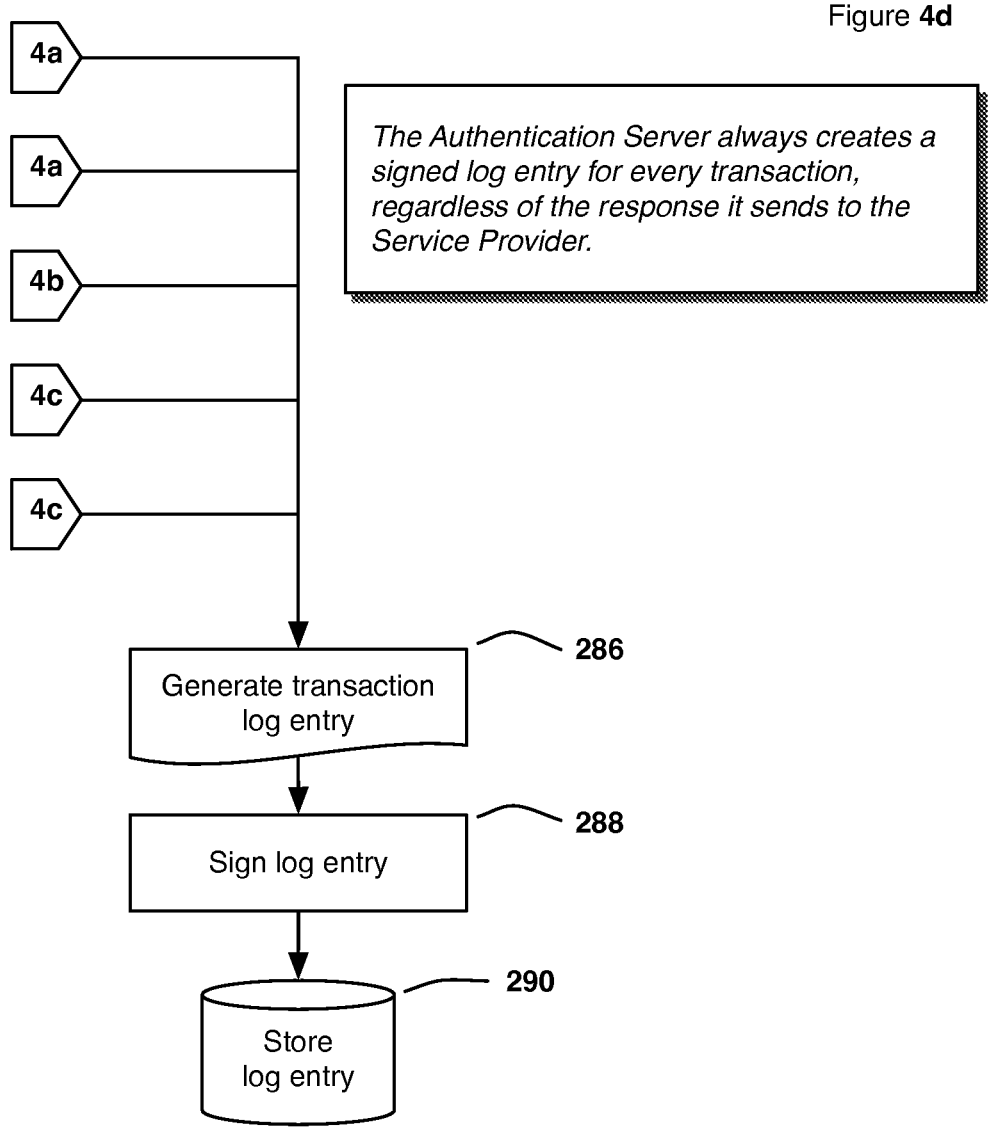

FIG. 4 illustrates the process the Authentication Server 14 follows while examining and authenticating resource provider and user messages 230. The elements are described above.

FIG. 5 demonstrates the process of classifying log entries and identifying new attack patterns.

1 The process begins with input data: log entries 292 created by the Authentication Server 14 during the process in FIG. 4, and information from other sources (eg. 3rd-party IP blacklists) 294.
2 The data is fed to Inspector processes. Inspector processes may operate purely on a log entry 296, may combine a log entry with information from another source 298 or rely entirely on data unrelated to a log entry 300.
3 Each Inspector provides an analysis indicator as an output (which should not be confused with the result indicator of the authenticated result). The analysis indicators are fed to a combination policy engine 302. The combination policy assigns weights to analysis indicators and combines them, according to some rules, to provide a final legitimacy score.
4 The legitimacy score is use to classify transactions 304 as being either legitimate 308 or being illegitimate 306.
5 Legitimate transactions are used as the basis of payment calculations 310.
6 Illegitimate transactions are further analyzed to discern any patterns, properties etc that can be used to identify other illegitimate transactions. For example, it may be found that a particular subnet of IP addresses has become strongly correlated with illegitimate transactions; further transactions from this subnet ought to be considered less trustworthy. The results of this analysis process could be fed back to the combination policy 314 or to inspectors 316.

Offline classification works in two stages. First, source data is fed into Inspectors. Each Inspector gives indicative values for the validity and/or legitimacy of the data provided. The analysis indicators given by each Inspector are fed to the combinator, which applies a policy to combine and weight the different analysis indicators into a final legitimacy score. Transactions are then classified as legitimate or illegitimate.

Legitimate transactions proceed to become the basis of payment calculations. Illegitimate transactions are stored separately for further analysis.

Inspectors need not rely entirely on Transaction log entries. Other information may be useful (for example, checking IP blacklists against client IP information collected during the Protocol). This architecture allows the Classifier to combine the "hard", high-confidence cryptographic analysis indicators of the Protocol with "soft" analysis indicators from outside the scope of the Protocol.

In this preferred embodiment, the client code that creates the user request message is a locally installed browser plugin, i.e. locally stored programming instructions, and hence is largely immune from a man-in-the-middle javascript injection/modification attack.

In an alternative embodiment, the client code that creates the user request message is provided in the form of javascript-code delivered to the client by either the resource provider or the authentication server. Any required keys would in this case be stored locally via an HTML5 API for example. While this approach allows a broader range of client devices that can produce a user request message, it is also less secure due to the potential for a man-in-the-middle javascript attack, and therefore, locally stored programming instructions is considered the preferred approach.

In an alternative embodiment, client code that generates the user request message is supplied as a network proxy program that intercepts and modifies network traffic from the client system.

In an alternative embodiment, client code that generates the user request message is supplied as a library or module which has been included in some third-party system. For example, it might be built into a program which communicates with the network, such as a game. Multiple programs on a single computing device might have independent copies of the software embedded, each with independent copies of the user's keys.

In an alternative embodiment, client code that generates the user request message is supplied as a component of the operating system which controls the user's computing device.

Figure 7:
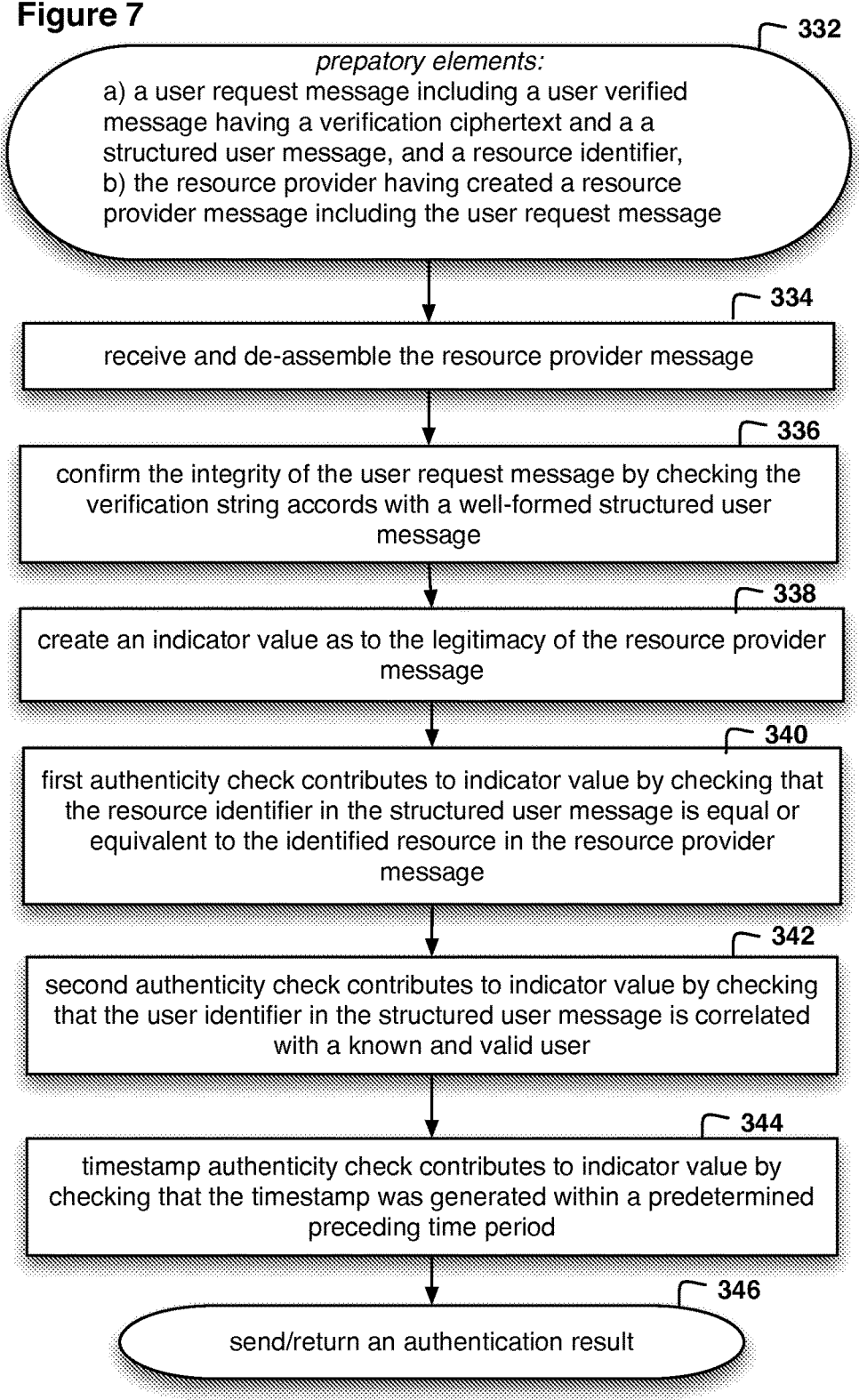
FIG. 7 is an overview of the method of authenticating the legitimacy of a request for a resource by a user according to an embodiment of the invention.

Further to the method outlined in FIG. 7, optimally, the structured user message followed a predetermined sequence of steps including a) the collation of the structured user message being signed using a signing key A to create a ciphertext signature b) the collation of the structured user message and the ciphertext signature then signed using an encryption key B resulting in the user verified message being comprised predominantly of a verification ciphertext, the steps of confirming the integrity of the user verified message, namely c) decrypting the user verified message using decryption key B to obtain the structured user message and the ciphertext signature, and d) confirming the integrity of the user verified message by using verification key A on the structured user message to confirm that the ciphertext signature is valid.

In step (a) and correlated step (d), by including a digital signature, it becomes possible to detect whether the data in the structure user message has been tampered with by the resource provider or some malicious 4th party. The digital signature also provides assurance that the structured user message was generated by the client and not by the resource provider or some malicious 4th party.

In step (b) and correlated step (c), by encrypting the client message we combine the data and signature into a single opaque, encrypted blob. This means that the resource provider or some malicious 4th party will not be provided with a signature and a "known plaintext" with which to perform known and potential attacks, based on having plaintext and signatures, aimed at recovering the signing key [ ] $A_s$.

In steps (a) and correlated step (d), and in steps (b) and correlated step (c), we use different keys for each operation. By using different keys, we reduce our exposure to compounded attacks on either the signature or encryption protocols which "leak" key bits. For example, if one attack can cause the encryption algorithm to "leak" 16 bits of the key, and a different attack can be used to cause the signature algorithm to "leak" 16 bits of the same key, then collectively up to 32 bits of the key have been leaked. This would reduce the space of all possible keys by a factor of 232, potentially in this example rendering the entire scheme vulnerable to other attacks—even simplistic brute force attacks.

In step (a), the structured user message includes a unique request identifier, assumed to be generated from a trustworthy random or pseudorandom source. This unique request identifier acts as a cryptographic "nonce" (a "number, used once"). If we do not include a nonce, it becomes possible to "replay" the structure user message. Even though each such message includes a time stamp, due to the unreliability of different system clocks—which might disagree either because of simple drift, misconfiguration, malfunction or the actions of a malicious agent—we cannot rely on time stamps to provide uniqueness. Thus, unless we add a nonce, each message can in theory be used more than once and still be in consideration as potentially legitimate. A malicious resource provider might "replay" a legitimate message several times in a few seconds, creating a false record of requests to their service.

In step (a), a nonce is chosen instead of a monotonically increasing integer sequence (the other common design alternative to thwart replay attacks), because a reliable monotonic integer sequence requires that the parties to a protocol retain a "stateful" session. That is, each party to the protocol would need to retain information about the current series number for each party. This means that, if more than one physical Authentication Server were deployed for performance reasons, they would need to coordinate this state between all Authentication Servers to ensure that the monotonicity criterion was not violated. This would form a severe performance and reliability constraint on the overall protocol and a sufficiently capable attacker could attempt to reuse a sequence number by sending messages to different physical Authentication Servers. A randomly or pseudorandomly-generated nonce avoids all these problems, requiring as it does no coordination amongst any parties or agents.

In step (a), the structured user message includes a string which is created by applying a one-way cryptographic digest function (a "hash" function) to the resource identifier. Hashes are used for many purposes. In this design, the hashing function reduces a resource identifier of any size to a predictable, fixed size. Because a hashing function requires no keys as an input, the Authentication Server can trivially perform the same operation against the resource identifier information forwarded in the provider message. Reducing the user's copy of the resource identifier to a hash has two advantages. The first is that network utilization is capped at a fixed amount. HTTP URLs, for example, can be very long—RFC 2616 specifies no hard upper limit on their size, though server implementations often truncate URLs to some fixed size (eg 4 kb). A hash, however, will always be a fixed size (dependent on the particular hashing algorithm and parameters chosen). The second advantage of sending a hash is related to the header-size advantage described above. Because the URL is sent as a hash, attackers cannot attempt to perform buffer-overflow attacks against the service provider using the Robojar protocol as their channel. Other parts of the underlying protocol may be subject to such an attack.

Although a few embodiments of the present invention have been shown and described, it would be appreciated by those skilled in the art that changes may be made in this embodiment without departing from the principles and spirit of the invention, the scope of which is defined in the claims and their equivalents.

The claims defining the invention are as follows:

1. A method of authenticating the legitimacy of a request for a resource by a user, the method being executable in an electronic communication system after the following predetermined steps have occurred:

a structured user message having been created, said structured user message including a resource identifier to identify the resource, a user identifier to identify the user that is requesting the resource and a digital signature having been created using a signing key held by the user;

a user verified message having been created in part by encrypting the structured user message, said user verified message at least partially comprising a verification string derived from at least part of the structured user message, a user request message having been assembled, said user request message including the user verified message, and the resource identifier to identify the resource being requested of the resource provider, the user request message having been sent to a resource provider, a process having been run by the resource provider receiving the user request message to create a resource provider message by at least adding a resource identifier to the user request message, said method including the steps of:

receiving and de-assembling the resource provider message, confirming the integrity of the user request message by checking the verification string accords with a well-formed structured user message, decrypting the user verified message to yield the structured user message and verifying the digital signature of the structured user message, creating a result indicator as to the legitimacy of the resource provider message by performing two or more authenticity checks, including a first authenticity check that the resource identifier in the structured user message is equal or equivalent to the identified resource in the resource provider message, and a second authenticity check that the user identifier in the structured user message is correlated with a known and valid user, and sending an authentication result including said result indicator.

2. A method as claimed in claim 1, wherein the verification string is ciphertext generated using an asymmetric key algorithm.

3. A method as claimed in claim 2, wherein the structured user message includes:

the collation of the structured user message being signed using a signing key $A_s$ to create a ciphertext signature, and the collation of the structured user message and the ciphertext signature then encrypted using an encryption key Be resulting in the user verified message being comprised predominantly of a verification ciphertext, and the step of confirming the integrity of the user verified message comprises the steps of:

decrypting the user verified message using a decryption key $B_d$ to obtain the structured user message and the ciphertext signature, and confirming the integrity of the user verified message by using verification key $A_v$ on the structured user message to confirm that the ciphertext signature is valid.

4. A method as claimed in claim 1, wherein the structured user message includes a sufficiently unique identifier, to ensure that the collation of the contents of the structured user message is not repeatable.

5. A method as claimed in claim 1, further comprising an additional step of creating a log entry in a parseable format, and thereafter parsing and processing the plurality of log entries created over time, to generate zero or more suspicious activity criteria based on analysis of the plurality of log entries.

6. A method as claimed in claim 5, wherein each log entry includes a digital signature, to create an unforgettable log entry.

7. A method as claimed in claim 5, wherein a third authenticity check is performed to check whether any information associated with the resource provider message matches any of the suspicious activity criteria.

8. A method as claimed in claim 1, wherein the structured user message includes a timestamp of when the request was created, and a timestamp authenticity checker is provided, that checks that the timestamp was generated within a predetermined preceding time period.

9. A method as claimed in claim 1, wherein the step of receiving the resource provider message is conducted over a secure channel, at least in part using a TLS client certificate.

10. A method as claimed in claim 1, wherein the resource is a request for an Internet resource over the IP protocol, and the resource provider message includes the user's IP address.

11. A method as claimed in claim 1, wherein the structured user message includes a device identifier that identifies the device used to generate the structured user message.

12. An authentication server operably coupled to an electronic communications network, said authentication server forming part of an authentication system for authenticating the legitimacy of a request for a resource by a user, said authentication system including one or more resource provider servers, arranged to receive a user request message from a user, said user request message comprising a user verified message and a resource identifier that identifies the resource being requested, and said one or more resource provider servers operable to create a resource provider message by at least adding a resource identifier to the user request message and forward the resource provider message to the authentication server, said user verified message comprising a structured user message including a user identifier and said resource identifier and a digital signature created using a signing key held by the user, said user verified message having been created in part by encrypting the structured user message and at least partially composed of a verification string derived from at least part of the structured user message, said authentication server being operable to receive and de-assemble said resource provider message as an input, and arranged to confirm said verification string accords with a well-formed structured user message according to a predetermined criteria, said authentication server being operable to decrypt the user verified message to yield the structured user message and verifying the digital signature of the structured user message, said authentication server being arranged to determine whether the resource identifier in the structured user message is equal or equivalent to the identified resource in the resource provider message, said authentication server being operable to determine whether the user identifier in the structured user message is a valid user identifier, said authentication server being operable to generate an authentication result including a result indicator as to the legitimacy of the resource provider message based on the result of confirming and determining, and said authentication server having a communications means to receive a resource provider message, and return an authentication result determined.

13. An authentication server as claimed in claim 12, wherein the verification string is ciphertext generated using an asymmetric key algorithm.

14. An authentication server as claimed in claim 13, wherein the predetermined criteria comprises:

decrypting the user verified message using decryption key $B_d$ to obtain the structured user message and a digital signature, the digital signature having been created by a signing key $A_s$ held by the user, said user verified message having been encrypted by an encryption key Be held by the user, and confirming the integrity of the user verified message by applying verification key $A_v$ against the structured user message, to confirm that the digital signature is valid.

15. An authentication server as claimed in claim 12, wherein the structured user message includes a sufficiently unique identifier, to ensure that collations of the contents of the structured user message are not repeatable.

16. An authentication server as claimed in claim 12, wherein the authentication system being operable to store log entries in a parseable format, and to thereafter parse and process the plurality of log entries created over time, to generate zero or more suspicious activity criteria based on using a classification analysis processor.

17. An authentication server as claimed in claim 16, wherein each log entry includes a digital signature, to create an unforgettable log entry.

18. An authentication server as claimed in claim 16, wherein the authentication server being operable to determine whether any information associated with the resource provider message matches any of the suspicious activity criteria.

19. An authentication server as claimed in claim 12, wherein the structured user message includes a timestamp of when the request was created, and being operable to check that the timestamp was generated within a predetermined preceding time period.

20. An authentication server as claimed in claim 12, wherein said communications means utilizes a secure communications channel, in part using a TLS client certificate.

21. An authentication server as claimed in claim 12, wherein the resource is a request for an Internet resource over the IP protocol, and the resource provider message includes the user's IP address.

22. An authentication server as claimed in claim 12, wherein the structured user message includes a device identifier that identifies the device used to generate the structured user message.

23. A non-transitory computer readable medium encoded with processing instructions which when executed using one or more processors cause performing a method of authenticating the legitimacy of a request for a resource by a user, in an electronic communication system, after the following predetermined steps have occurred:
- a structured user message having been created, said structured user message including a resource identifier to identify the resource, and a user identifier to identify the user that is requesting the resource and a digital signature having been created using a signing key held by the user;
- a user verified message having been created in part by encrypting the structured user message, said user verified message at least partially comprising a verification string derived from at least part of the structured user message,
- a user request message having been assembled, said user request message including the user verified message, and the resource identifier to identify the resource being requested of the resource provider,
- the user request message having been sent to a resource provider,
- a process having been run by the resource provider receiving the user request message to create a resource provider message by at least adding a resource identifier to the user request message, said method including the steps of:
- receiving and de-assembling the resource provider message,
- confirming the integrity of the user request message by checking the verification string accords with a well-formed structured user message,
- decrypting the user verified message to yield the structured user message and verifying the digital signature of the structured message,
- creating a result indicator as to the legitimacy of the resource provider message by performing two or more authenticity checks, including a first authenticity check that the resource identifier in the structured user message is equal or equivalent to the identified resource in the resource provider message, and a second authenticity check that the user identifier in the structured user message is correlated with a known and valid user, and
- sending an authentication result including said result indicator.

* * * * *